April 28, 1925.

A. LUSCHENOWSKY

WEDGE GEAR

Filed June 25, 1923

1,535,487

Inventor
Alexander Luschenowsky
by P. Singer
Atty

Patented Apr. 28, 1925.

1,535,487

UNITED STATES PATENT OFFICE.

ALEXANDER LUSCHENOWSKY, OF VIENNA, AUSTRIA.

WEDGE GEAR.

Application filed June 25, 1923. Serial No. 647,709.

*To all whom it may concern:*

Be it known that I, ALEXANDER LUSCHENOWSKY, citizen of Austria, and resident of Vienna, Austria, Artariastrasse 8, have invented certain new and useful Improvements in Wedge Gears, for which I have applied for the following patents: Austria, filed June 29, 1922, not yet granted; Germany, filed July 17, 1922, Patent 373160; and I do hereby declare that the following is a full, clear, and exact specification, reference being had therein to the accompanying drawing.

The invention relates to a gear for the transmission of movements or forces by displacing a wedge of adapted shape in a slot or hole of the driven part.

According to the invention the wedge comprises at least two oblique faces, parallel to each other, and two or more parallel guiding faces which include the wedge angle with the first mentioned oblique faces.

The invention is illustrated by way of example in the drawing, in which—

Figure 1:
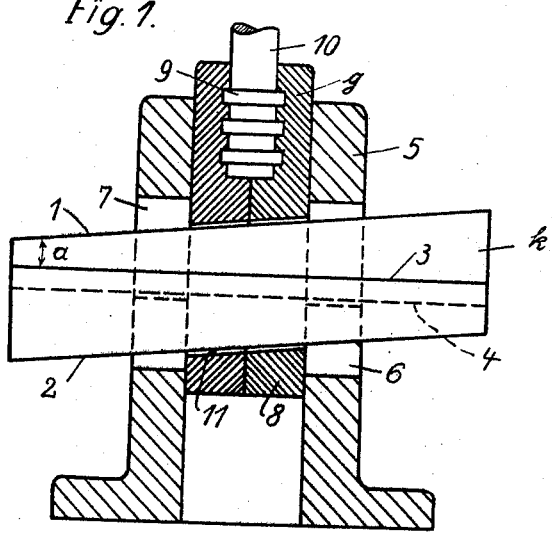
Fig. 1 is a longitudinal section.
Figure 2:
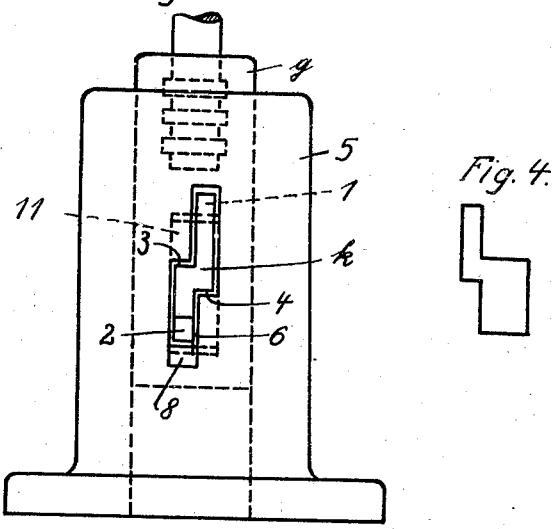
Fig. 2 is a side view in a plane at right angles to that of Fig. 1.

According to Figs. 1 and 2 the wedge $k$ consists essentially of two wedges lying in different planes and connected to each other so as to have parallel oblique working surfaces 1 and 2 respectively and also parallel guiding surfaces 3 and 4 respectively; between both the said groups of surfaces the wedge angle $a$ is included. A rigid sleeve 5 is provided for guiding the oppositely directed faces 3 and 4 of the wedge included in perforations or slots 6 and 7, whilst said slots are as large as to remain without contact with the oblique wedge faces 1 and 2.

The driven part, which is shown in the drawing as a hollow bolt 8 composed of two parts holding a pushing or drawing rod 10 by aid of collars 9, is provided with a slot 11 contacting the oblique wedge faces 1 and 2 without dead movement, whilst the guiding faces 3 and 4 are free to move through this slot without any contact.

This device acts as follows. By moving the wedge lengthwise on its guiding faces 3 and 4 in one direction or in the other either the one oblique face, 1, or the other, 2, forces the driven part, 8, 9, 10 upward or downward respectively. Between the crosswise movement, thus inducted, and the lengthwise movement of the wedge the angle is of 90°, but every other angle may be provided as far as needed and can be put in practice. The paths and velocities of the wedge and the driven part are in every position proportional as destined by the constant wedge angle $a$.

This new gear is adapted to transmit equal forces in both directions of movement.

Figure 3:
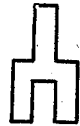
Figs. 3 and 4 show special modifications of the wedge for certain purposes.
Figure 4:

If the gear is to be used for getting a working stroke, and a return stroke without load (as in single acting presses), the specific pressures and the wear and tear would be unequal on the faces of the both wedge halves respectively. In this case the wedge may have the cross section of Fig. 3 or Fig. 4, in which the surfaces working in the one direction are greater than the surfaces working in the opposite direction, so as to be loaded with equal specific pressures.

The new device, in comparison with other devices used for similar purposes, has the advantages that it needs less constructional space and is specially strong and durable. Moreover, the single parts can very simply be dismantled and replaced if damaged, and they can be very effectively lubricated and controlled.

The friction and every dead motion can be reduced to a minimum by forming the sliding faces as sleeve-like bearings with low specific pressure.

The device is applicable for instance in presses, shears, planing and shaping machines and other machine tools, further instead of eccentrics in pressing devices for rolling mills and the like, or for the control of frictional gears and clutches, change speed and reversing gears, valve gears and the like.

All desired relations of movements and forces may be obtained at will by choosing an adapted wedge angle $a$. If this angle is made greater than the angle of friction, so that the gear is not self locking, then by locks or excavations provided in the wedge an unwanted sliding of the wedge may be obviated.

Finally the new wedge is also adapted to replace everywhere the known double wedges, from which its shape may be derived by displacing the both single wedges with respect to each other in the height and in the breadth.

I claim:

1. A wedge gear comprising a wedge having at least two oppositely directed parallel guiding faces, and two oppositely directed parallel oblique working faces, which include the wedge angle with the said guiding faces.

2. A wedge gear comprising a wedge, a casing and a driven part, two oppositely directed parallel guiding faces on said wedge, fitting into suitable slots of said casing, and two further oppositely directed parallel faces, which are oblique to said guiding faces and fit into a slot of said driven part.

3. A wedge gear comprising a wedge, a driven part and a casing adapted to guide said wedge and said driven part in any angle with respect to each other, two oppositely directed parallel guiding faces on said wedge, fitting into suitable slots of said casing, and two further oppositely directed parallel faces, which are oblique to said guiding faces and fit into a slot of said driven part.

4. A wedge gear comprising a wedge, a casing and a driven part, two oppositely directed parallel guiding faces on said wedge, fitting into suitable slots of said casing, and two further oppositely directed parallel faces, which are oblique to said guiding faces and fit into a slot of said driven part, one of said guiding faces and said oblique faces having a greater area than the other respective faces, in proportion to different pressures to be exerted in opposite directions of movement.

In witness whereof I affix my signature.

ALEXANDER LUSCHENOWSKY.